(12) United States Patent
Schuchard

(10) Patent No.: US 6,892,422 B2
(45) Date of Patent: May 17, 2005

(54) SPRING-LOADED HINGE (76) Inventor: Klaus Schuchard, Ganzhornatrasse 3, 75305 Nuuenbürg (DE)

( * ) Notice: Subject to any disclaimer, the term of this patent is extended or adjusted under 35 U.S.C. 154(b) by 0 days.

(21) Appl. No.: 10/354,297

(22) Filed: Jan. 30, 2003

(65) Prior Publication Data
US 2003/0172492 A1 Sep. 18, 2003

(30) Foreign Application Priority Data
Feb. 1, 2002 (DE) .......................... 102 04 821

(51) Int. Cl.[7] ................................. G02C 5/16
(52) U.S. Cl. .......................... 16/228; 351/113; 351/153
(58) Field of Search .................. 16/228, 232, 257–259, 16/286; 351/111, 113–115, 153

(56) References Cited

U.S. PATENT DOCUMENTS

| 5,400,090 | A | * | 3/1995 | Chen .......................... 16/228 |
| 5,657,107 | A | | 8/1997 | Wagner et al. |
| 6,241,354 | B1 | | 6/2001 | Schuchard et al. |
| 6,283,593 | B1 | | 9/2001 | Shih |
| 6,336,251 | B1 | * | 1/2002 | Sartor ........................ 16/228 |
| 6,353,965 | B1 | * | 3/2002 | Lo ............................. 16/228 |
| 6,390,620 | B1 | * | 5/2002 | Montalban .................. 16/228 |
| 6,505,933 | B2 | * | 1/2003 | Schuchard et al. .......... 16/228 |
| 6,547,389 | B2 | * | 4/2003 | Hotellier .................... 16/228 |
| 6,585,371 | B1 | * | 7/2003 | Lin ............................. 16/228 |

FOREIGN PATENT DOCUMENTS

| DE | 93 06 387.3 | 8/1993 |
| DE | 197 35 230 | 2/1999 |
| WO | WO 96/29623 | 9/1996 |

* cited by examiner

Primary Examiner—Daniel P. Stodola
Assistant Examiner—Christopher Boswell
(74) Attorney, Agent, or Firm—Morriss O'Bryant Compagni (57) ABSTRACT A spring-loaded hinge (1) is suggested for eyeglasses with a center part and bows surrounding eyeglass lenses, with at least one spring element (41), at least one hinge element (9) having a hinge eye (11) and with a locking element (7). It is characterized in that the locking element (7) consists of elastically deformable flat material, especially of a strip of sheet metal, the locking element (7) has a locking tab (37), and the flat material has a hole (81) for holding a spring pin (15).

19 Claims, 6 Drawing Sheets

SPRING-LOADED HINGE

RELATED APPLICATIONS

The present application claims priority to German Patent Application 10204821.5, filed Feb. 1, 2002.

BACKGROUND

The invention relates to a spring-loaded hinge for eyeglasses.

Spring-loaded hinges of the type mentioned here are known. They are used to improve the closing and opening behavior of eyeglass bows and to increase the flexibility and wearing comfort of the eyeglasses. Usually such hinges have at least one hinge element having a hinge eye, a locking element and at least one spring element. It is conceivable that the locking element is in engagement with the housing of the spring-loaded hinge and serves as a stop for the spring element. In this way, it is possible to house and to stop the hinge element in the housing, and thus also the hinge eye, with spring loading.

In addition, symmetrical locking elements are known for this that have, for example, two locking elements that are designed the same that can be brought into engagement with the housing. However, it has been found that the locking devices require a relatively large amount of construction space.

In order to avoid these disadvantages, an attempt was made to use locking elements with only one locking device. However, it was found in this process that because of the holding forces, these had a tendency to jam with a spring pin, which induced high bending moments in it and leads to a failure of the spring-loaded hinge during use due to jamming.

In order to avoid this, asymmetrical locks are known that have a tube-shaped recess in which the spring pin can be mounted. Finally, it has been found that in spite of the tube-shaped recess, the tendency to jam remains and a certain wear continues to occur. In addition, it has been found that additional construction space has to be provided in the longitudinal direction of the spring pin for the guide element. As a result, there is a comparably thin, but longer, spring-loaded hinge.

SUMMARY OF THE INVENTION

Therefore, the task of the invention is, starting from the state of the art, to produce a spring-loaded hinge of the type named at the beginning, which prevents this disadvantage.

To solve this task, a spring-loaded hinge for eyeglasses is suggested that has an elastically deformable locking element that consists of flat material, especially of a strip of sheet metal, which has a locking tab and by the fact that the flat material comprises an opening to hold a spring pin. This offers the advantage that the flat material can be used as a stop for the spring element and thus to absorb the spring forces. In this process, the flat side of the same can be turned toward one end of the spring element so that the locking element requires very little construction space in the lengthwise direction of the spring-loaded hinge, which makes possible a spring-loaded pin that is shorter overall.

An embodiment of the invention is preferred that distinguishes itself in that the locking element has a guide area. This guide area can advantageously cooperate with another guide area of the hinge element of the spring-loaded hinge, whereby the hinge element can be stabilized. In addition, forces can be introduced in the locking element through the guide area that additionally stabilize it and hold it in a desired position, which prevents it from jamming with the hinge element. In addition, the wear occurring due to friction can be minimized on the locking element and the hinge element.

Another preferred embodiment of the invention is characterized in that the guide area can be made of a strip of material. This offers the advantage that the surface of the strip can be used as a guide area without complicated machining.

An embodiment of the invention is especially preferred that is characterized in that the locking element is designed as a part produced with a stamping/bending machine. A locking element such as this can be manufactured with few work steps from standard flat material and is therefore especially economical and cost-effective.

Further advantages result from the remaining subclaims.

BRIEF DESCRIPTION OF THE DRAWINGS

The invention will be explained in the following in more detail using the drawings. They show.

DETAILED DESCRIPTION

Figure 1:
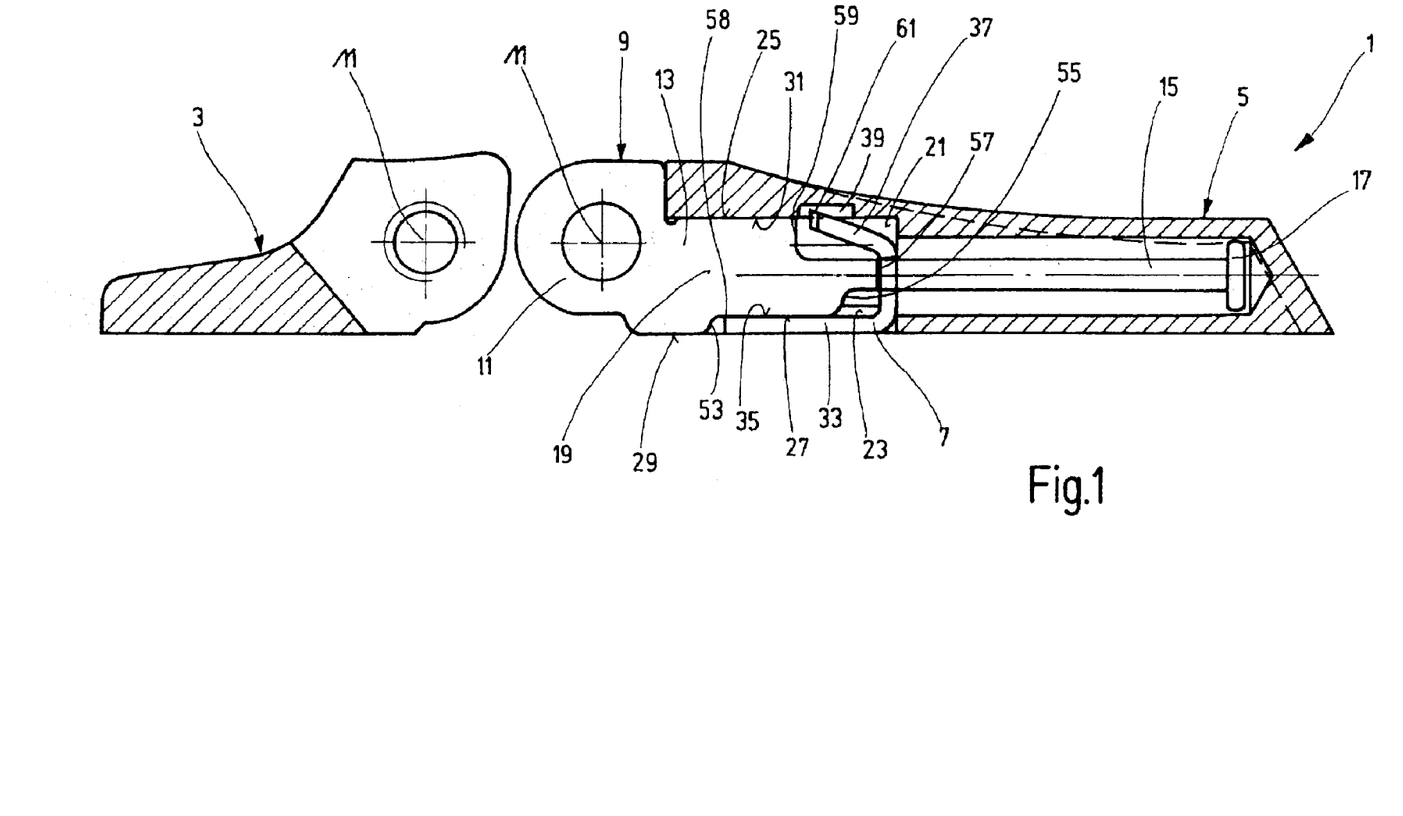
FIG. 1 shows a side view of partially cut-away parts of the spring-loaded hinge with hinge elements not mounted.

FIG. 1 shows, in side view, parts of a disassembled spring-loaded hinge 1, whereby a first hinge element 3 and a housing 5 are illustrated in longitudinal cross section. A locking element 7 can also be seen as well as a second hinge element 9, which has a hinge eye 11, a guide area 13, a spring pin 15 that is used for guiding a spring shown in FIGS. 2, 3 and a stop 17.

The hinge eye 11 and the guide area 13 in this embodiment exhibit two common surfaces that run parallel to the plane of the image, of which one surface 19 is visible. The surface 19 can interact, at least in some areas, with gliding surfaces of housing 5 that are not visible here. Gliding surfaces 21, 23 of housing 5 can be seen that are mounted parallel to the gliding surfaces that are not seen and are partially covered by the second hinge element 9 and the locking element 7. The second hinge element 9 can be mounted so that it glides in its lengthwise direction on gliding surfaces 21, 23 of housing 5 and on the surface of the second hinge element 9 parallel to surface 19 and the gliding surfaces of housing 5 and surface 19, each of which is not visible.

In addition, the guide area 13 of the second hinge element 9 and housing 5 have other guide surfaces 25, 27, 29 and 31 that are perpendicular to the image plane. In this process, the guide surfaces 31 and 25 are assigned to each other and cooperate. The guide surface 29 can cooperate with another part of the eyeglasses that is not shown here, e.g. a bow, on which the spring-loaded hinge 1 is mounted. The guide surface 27 cooperates with a guide area 33, which is designed here as a strip of material and has another guide surface 35, of locking element 7.

Locking element 7 has a locking tab 37 that engages in a locking recess 39 of housing 5 and can latch there.

Figure 2:
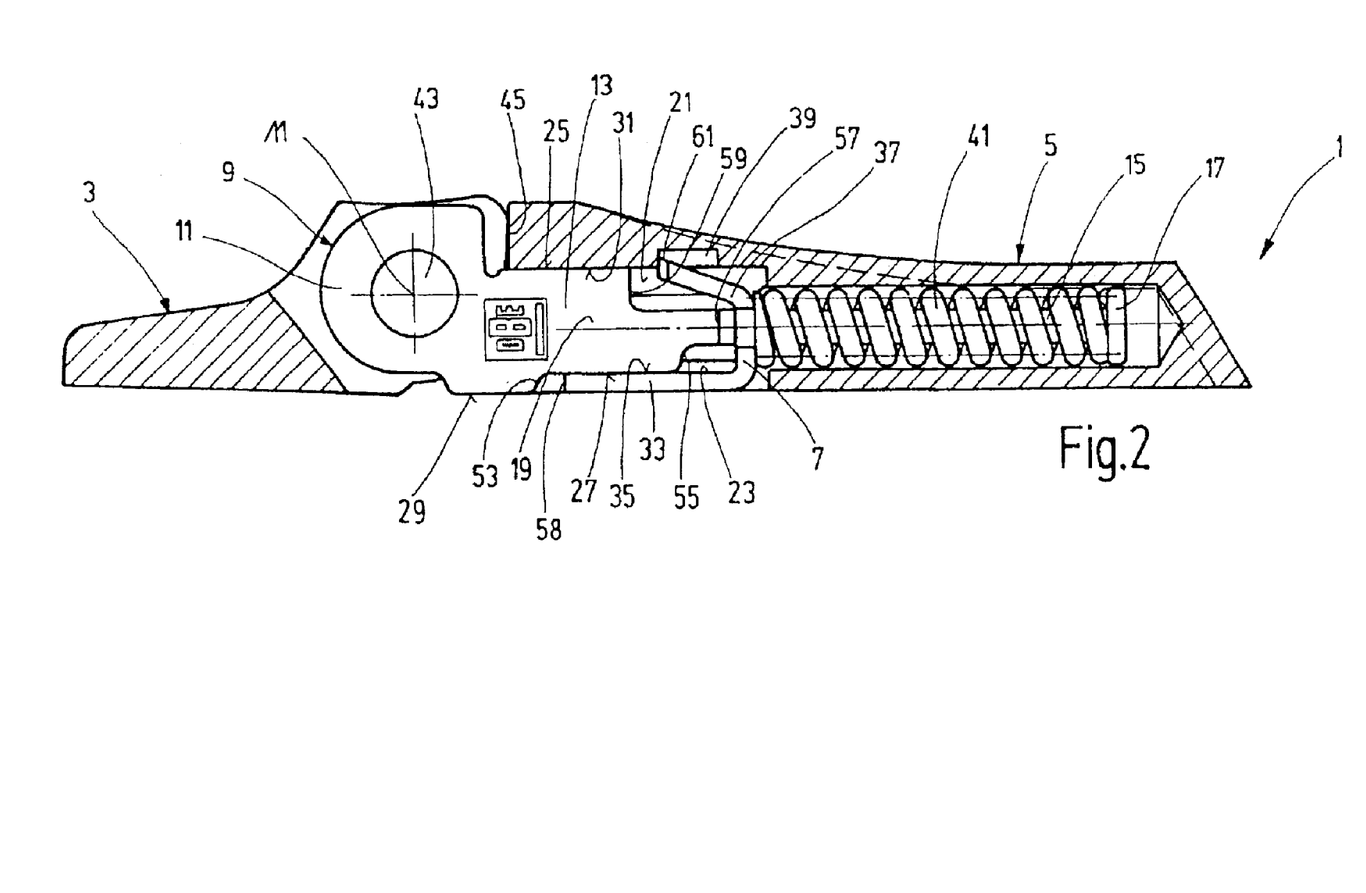
FIGS. 2 and 3 show side views of the spring-loaded hinge shown in FIG. 1 in assembled condition in various function positions.
Figure 3:
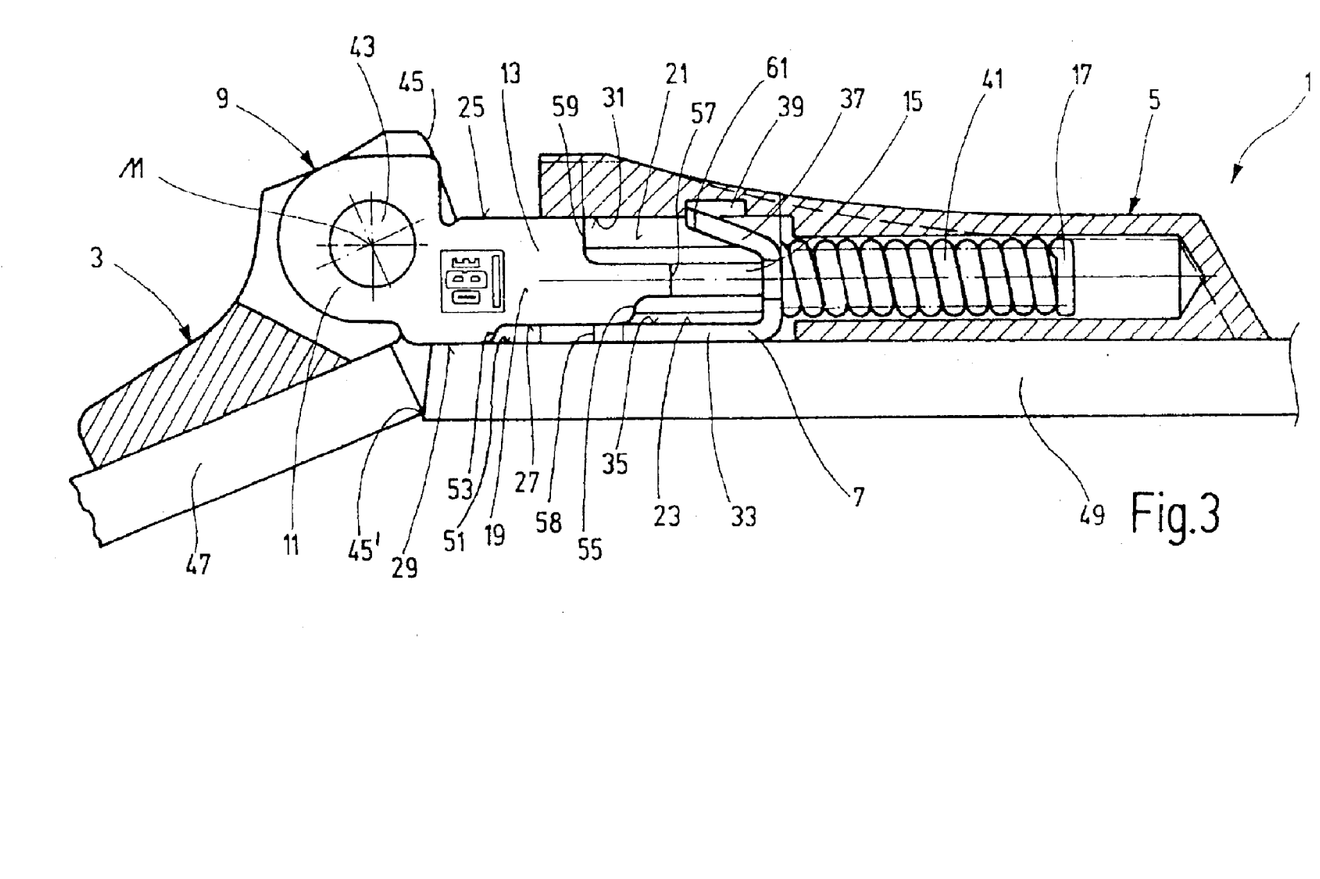

FIGS. 2 and 3 show the spring-loaded hinge 1 in FIG. 1 in various functional positions. Common parts are provided with the same reference numbers so that to this extent, reference is made to FIG. 1.

FIG. 2 shows the spring-loaded hinge 1 in open condition, in that a center part of attached eyeglasses assumes an angle of approximately 90°, preferably approximately 88°, with the eyeglass bows. This position thus corresponds to the open condition of the eyeglasses as they are worn.

FIG. 3 shows the spring-loaded hinge 1 in an excessively open position. In this case, the center part of the eyeglasses and the associated eyeglass bows are at an obtuse angle to each other. This position makes sense when taking off and putting on the eyeglasses.

In both illustrations, the locking tab 37 contacts the locking recess 39 of housing 5. Locking element 7 is pressed by a spring 41, which is located between it and stop 17, against the locking recess 39 of housing 5. The transmission of force occurs, starting from the locking recess 39 of housing 5, over the locking tab 37 of locking element 7 to the pre-stressed spring 41 that contacts stop 17, by way of spring pin 15 of second hinge element 9 to its hinge eye 11, which generally transfers the force to one or two other hinge eyes of the first hinge element 3 by way of a hinge joint 43 of spring-loaded hinge 1 formed by a screw, which ultimately stops at housing 5 in an area 45 of the other hinge eyes as can be seen in FIG. 2, i.e. introduces the opposing force into housing 5 of spring-loaded hinge 1.

FIG. 3 shows the spring-loaded hinge 1 in a function position in which the eyeglass bows are opened extra wide, i.e. more than 90°. Also indicated are eyeglass parts 47 and 49, whereby e.g. the eyeglass part 49 can be an implied eyeglass bow and eyeglass part 47 can be an implied center part—or vice versa—of the eyeglasses. Eyeglass parts 47, 49 are connected in a suitable manner, e.g. by welding, gluing, soldering, bonding, riveting, etc. to spring-loaded hinge 1 and thus are hinge-mounted on it.

The function illustration according to FIG. 3 corresponds to the maximum run-out of eyeglass parts 47, 49, whereby the spring windings of spring 41 are blocked and the eyeglass parts 47, 49 assume e.g. an obtuse angle of 157° to each other. This run-out of the eyeglass parts makes possible a large spreading of the eyeglass bows so that the eyeglasses can comfortably be put on and taken off. In this function position, the opposing force of spring 41 is transferred maximally to second hinge element 9, which transfers it to the first hinge element 3. It can also be seen that the opposing force in this function position is transferred by way of eyeglass parts 47, 49, at an area 45', from the first hinge element 3 over the eyeglass part 49 to housing 5.

Hinge joint 43 of spring-loaded hinge 1 has a point of rotation M, at a distance from which area 45' is arranged. Because of the spring forces transferred, there is a torque which, starting from the function position shown in FIG. 3, increases the angle of eyeglass parts 47, 49 in this embodiment by approximately 157° to approximately 182°, which corresponds to the function position shown in FIG. 2. The function position shown in FIG. 2 corresponds to an equilibrium position, whereby spring 41 has a maximum length and the spring force is introduced over the areas 45, 45' from first hinge element 3 into housing 5 such that there is equilibrium of moment. First hinge element 3 thus contacts the front side of the housing so that a defined function position of all hinge elements with respect to each other results.

For closing the eyeglasses, the angle can be further increased until the eyeglass bows lie approximately parallel to the center part of the eyeglasses. When the eyeglasses are worn, the eyeglass parts 47, 49 can assume an angle to each other that lies between 157° and 182°, i.e. between the function illustrations according to FIGS. 2 and 3. In this way, the eyeglasses can adjust to the respective wearer and are at a slight pressure due to the deflection of the spring force on the eyeglass bows that was just described, i.e. because of the induced torques, which makes possible especially good wearing comfort and good fit of the eyeglasses.

It can also be seen from FIG. 3 that even with the maximum run-out angle of eyeglass parts 47, 49 the second hinge element 9 is optimally guided. What is important here is that even with maximum run-out, i.e. if spring 41 is blocked according to FIG. 3, the individual guide surfaces are still in contact to an adequate extent.

In detail, in each case parts of the first guide surface 24 of second hinge element 9 cooperate with the fourth guide surface 31 of housing 5 and second guide surface 27 of second hinge element 9 with the fifth guide surface 35 of guide area 33 of locking element 7 and the third guide surface 29 of second hinge element 9 with a sixth guide surface 51 of eyeglass part 49.

Second hinge element 9 is thus mounted so that it can glide on all three areas and is thus protected against distortion and jamming because of the moments induced by the opening and closing of the eyeglass bows. In addition, gliding surfaces 21, 23 cooperate laterally with the guide area 13 of second hinge element 9. This stabilizes the second hinge element 9 with respect to housing 5 against unintentional turning around the center axis of spring pin 15. This means that the spring-loaded hinge 1 is adequately stabilized against forces that occur during incorrect opening and closing of the eyeglass bows and during wearing of the eyeglasses. Because of the support of locking element 7 by the guide and sliding surfaces, pull-out forces up to 250 N can be achieved. In addition, jamming of the locking element is securely prevented.

In addition, it becomes clear that guide area 33 of locking element 7 supports the second hinge element 9. At the same time, second hinge element 9 that supports itself on guide area 33 pushes down locking element 7, i.e. pushes it against eyeglass part 49, so that it contacts it securely and thus remains securely positioned in spite of the high spring forces that are introduced into locking element 7 by spring 41. Guide area 33 of locking element 7 thus additionally acts as a support area for the second hinge element 9 as well as holding down locking element 7 and/or securing it against rotation. This means that during the high forces that can occur on spring 41 when it is blocked can be transferred to and/or absorbed by locking element 7 without jamming or turning and thus without damaging spring pin 15. Locking element 7 is thus held secure against rotation in all function positions of the spring-loaded hinge 1 so blocking of spring pin 41 is securely prevented.

Gliding surfaces 27 and 29 of second hinge element 9 transition into each other over a step 53, whereby the height of step 53 corresponds to the thickness of guide area 33 of locking element 7. This means it is insured that the guide surfaces 51 and 29, and 35 and 27, can be in contact uniformly with each other.

Second guide surface 27 of hinge element 9 is limited by another step 55, where the height of guide area 13 of hinge element 9 is reduced to the thickness of spring pin 15. On its reduced side, guide area 13 has a stop 57 at which it transitions into spring pin 15.

Stop 57 and/or step 53 of hinge element 9 can contact locking element 7 and/or one end 58 of guide area 33 of locking element 7 for mounting the spring-loaded hinge 1 so that it can be compressed into the housing 5 by means of second hinge element 9. To do this, locking element 7 is elastically deformed in the area of locking tab 37 so that it comes to rest in the area of a third step 59, at which the guide area 13 is reduced, as seen from above. During introduction of the second hinge element 9 into housing 5, a top end 61 of locking element 7 glides along fourth guide surface 31 of housing 5 until the locking tab 37 engages in the locking recess 39 of housing 5. In this process, care must be taken that locking element 7 can be introduced far enough into housing 5. FIG. 1 shows locking element 7 and the second hinge element 9 in an end position, whereby it is introduced as far as possible into housing 5. Preferably, locking element 7 can be introduced 0.2 mm further into the housing as the final locking position, at which the top end 61 comes into contact with locking recess 39, as shown in FIGS. 2 and 3.

Spring-loaded hinge 1 can thus be pre-assembled by simply pre-assembling the second hinge element 9 and introducing it into housing 5. In a second step, the first and second hinge elements 3, 9 can be connected to each other in the area of hinge joint 43.

Figure 4:
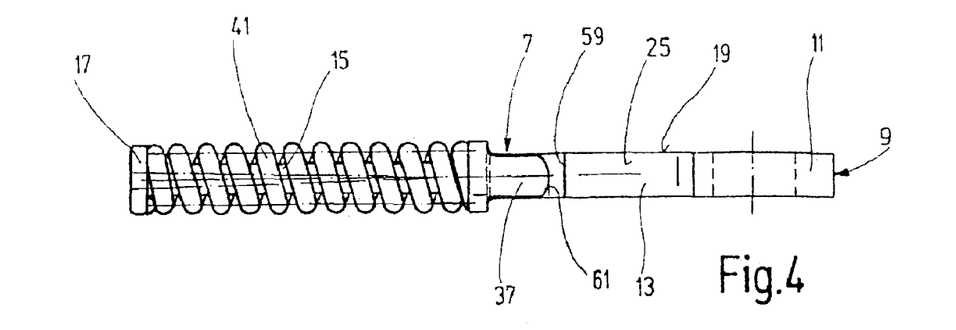
FIG. 4 shows a top view of a hinge element with a spring.

FIG. 4 shows second hinge element 9 with the pre-assembled locking element 9 and spring 41 in top view. Common parts are provided with the same reference numbers so that to this extent the description refers to the preceding figures. The guide area 13 with first guide surface 25 that is reduced at step 59 can be recognized. In the area of the reduction of guide area 13, locking element 7 with locking tab 37 is located. The top end 61 of locking tab 37 is rounded in an arc. As a result, the locking recess can also have an appropriately rounded contour. This makes possible an especially good engagement of locking element 7 in housing 5. However, other shapes of recesses are also conceivable and shapes of latching means that engage in them. What is important here is that they engage securely with each other and thus ultimately locate the second hinge element 9 in housing 5.

Figure 5:
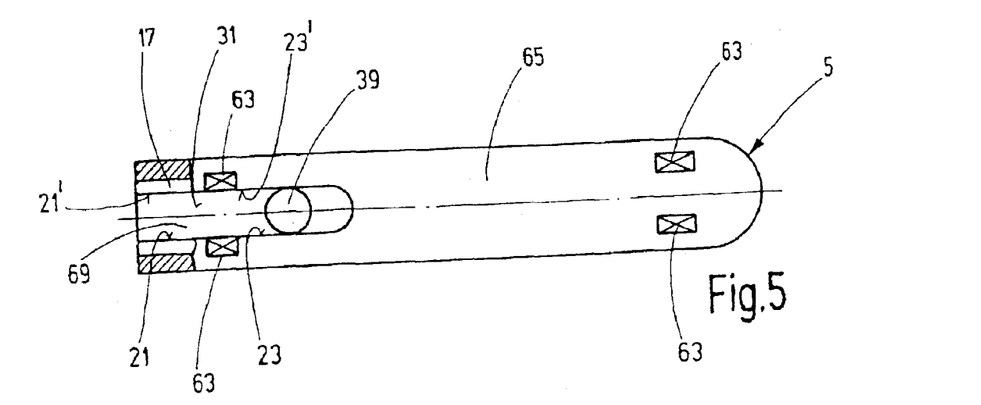
FIGS. 5 to 7 show various views of a spring-loaded hinge housing.
Figure 6:
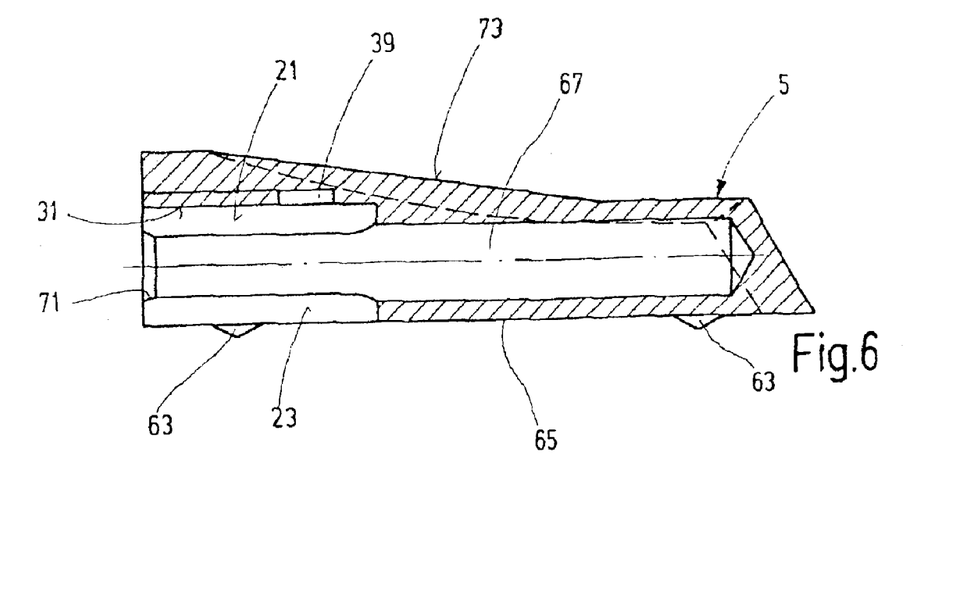
Figure 7:
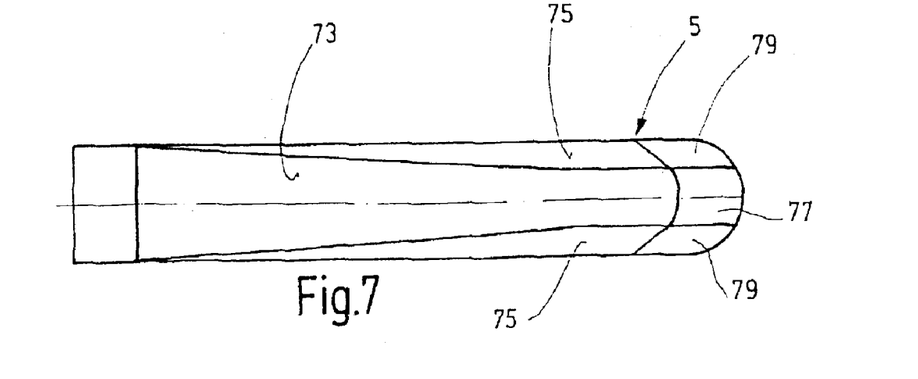

FIGS. 5 to 7 show various views of housing 5. Common parts are provided with the same reference numbers so that to this extent the description refers to the preceding figures.

On the underside 65, housing 5 can have weld buttons 63 with which it can be welded to one of eyeglass parts 47, 49.

Housing 5 has a recess formed in the longitudinal direction of the housing as hole 67 into which the pre-assembled second hinge element 9 can be placed.

A partial cutaway view of housing 5, as shown in FIG. 5, and the longitudinal cross section in FIG. 6 show that a groove 69 with an internal width that is less than that of the diameter of hole 67 is placed at the opened side of the hole from below into the housing 5. In the area of groove 69, housing 5 has gliding surfaces 21, 23 and other gliding surfaces 21', 23' and the fourth guide surface 31. Groove 69 thus corresponds in its dimensions to guide area 13 of second hinge element 9, which can be placed in it and is thus mounted in it so that it can slide. Second hinge element 9 can thus be slid along the lateral limiting surfaces of groove 69 running in longitudinal direction in housing 5, in axial direction of spring pin 15. The locking recess 39 of housing 5 can also be seen, which in this embodiment is designed so that it is circular. In this way, it can especially easily be placed in housing 5 as a blind hole.

In FIG. 6, it can be seen that hole 67 of housing 5 has a chamfer 71 that serves as an aid for introduction of second hinge element 9 into housing 5.

On its top side, as can be seen in FIG. 7, the housing gets narrower along surfaces 73, 75, 77, 79. It is advantageous that in the area of groove 69, where the highest forces are transferred, housing 5 is correspondingly designed at its widest, i.e. most stable. In addition, the narrowing running to the right from the opening of hole 67 achieves an attractive and slim visual appearance of the spring-mounted hinge 1.

Figure 8:
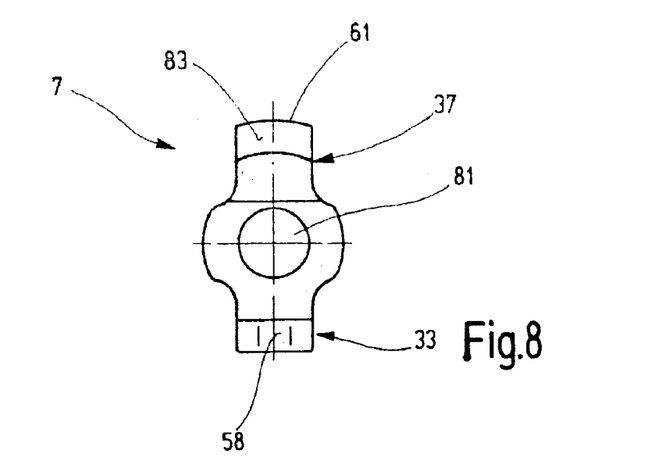
FIGS. 8 to 10 show various illustrations of a locking element.
Figure 9:
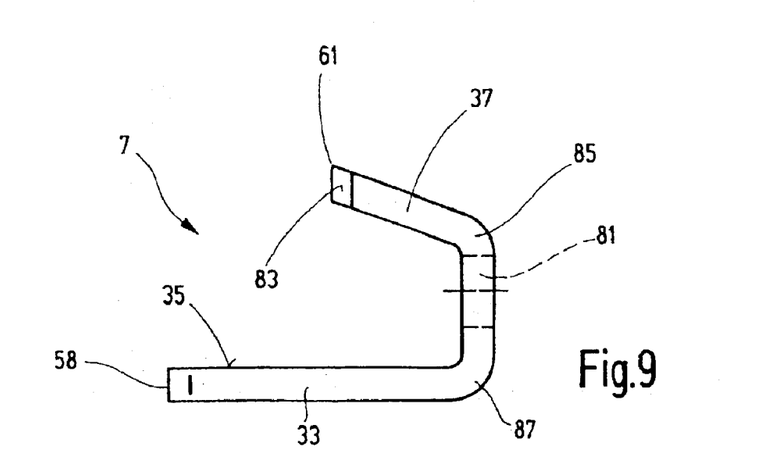
Figure 10:
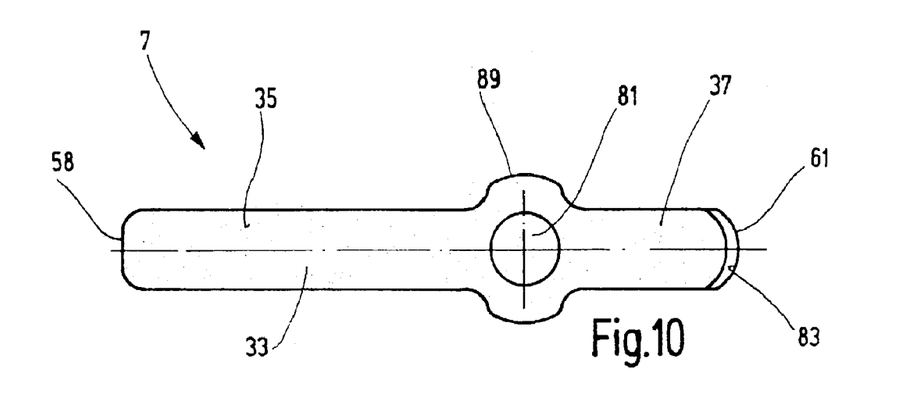

FIGS. 8 to 10 show various illustrations of locking element 7. Locking element 7 has an opening 81 that can be designed as a punch or drilled hole in which spring pin 15 of second hinge element 9 can be placed.

Top end 61 of locking tab 37 has a contact surface 83 that is curved here and that is adapted to the surface of the blind hole of locking recess 37 of housing 5. In this process, the top end 61 is designed with an arc shape and provided with a bevel that runs over the entire width of locking element 7.

The angle of the bevel corresponds to a bending angle that locking tab 37 assumes with respect to locking recess 39, so that locking tab 37 securely contacts the wall of locking recess 39.

It is advantageous that housing 5 has a locking recess 39 that is exactly adapted to the top end 61 of locking tab 37. This means that with the help of locking element 7, hole 67 of housing 5 can be closed and spring 41 and spring pin 15 are protected from contamination and any fluids that could possibly penetrate.

As can be seen in FIG. 9, the locking element is manufactured of flat material, especially as a part that has two bends 85 and 87 and is produced with a stamping/bending machine. The bending angle of bend 87 is approximately 90° here. At bend 85, locking element 7 is bent by an obtuse angle, which is preferably approximately 110°. Thus the angle in the summit point of the bevel that is adapted to the area of the hole in locking recess 37, which forms contact surface 83, is preferably approximately 20°.

In FIG. 10, which shows locking element 7 in the perspective of FIG. 8 but not in bent condition, the fifth guide surface 35 of guide area 33 can be seen. Fifth guide surface 35 and the other guide surfaces of spring-mounted hinge 1 can be provided with a special sliding coating. In addition, the material of the locking element 7 can be selected in such a way that it cooperates especially well with the material of guide area 13 and/or has especially good gliding properties, i.e. has a low coefficient of friction with respect to guide area 13.

In the area of hole 81, the strip-shaped material of locking element 7 has an expansion zone 89 that is preferably designed with a ring shape and is adapted to the diameter of hole 67 for sealing the spring mechanical parts. At the expansion zone 89 that surrounds hole 81, the spring 41 can come to rest from one side and step 57 of second hinge element 9 can come to rest on the other side. Thus, it is clear that the thickness of expansion zone 89 directly influences the construction length-with the same functionality-of spring-mounted hinge 1.

The expansion zone 89, that is preferably ring-shaped, can also be manufactured of flat material, especially a strip of sheet metal of locking element 7, e.g. by stamping, which makes possible a spring-mounted hinge 1 that has a short structure.

In the further development according to FIG. 10, it can be seen that the locking element 7 has a strip-shaped section on both the right and left sides of hole 81, whereby a first strip-shaped section makes guide area 33 and a second strip-shaped section makes the locking tab 37. In this embodiment, the strip-shaped section of guide area 33 is longer than that of locking tab 37. It is also conceivable to provide these with equal length or in reverse length relationships.

Thus, it is conceivable to reduce guide area 33 of the locking element to such an extent that it serves only for stabilizing it. In this case, the third guide surface 29 could be enlarged accordingly and be used to guide second hinge element 9 in housing 5.

In the named embodiment, second hinge element 9 has a hinge eye that cooperates with one or two other hinge eyes of first hinge element 3. It is conceivable to reverse this relationship or even provide an optional combination of hinge eyes that cooperate with each other.

What is claimed is:

1. A spring-loaded hinge for eyeglasses with a center part and bows surrounding eyeglass lenses, comprising a housing having a guide surface, at least one spring element, at least one hinge element having a hinge eye and an upper guide surface oriented for contacting said guide surface of said housing for facilitating longitudinal movement therealong and having adjacent guide surfaces positioned opposite said upper guide surface where said adjacent guide surfaces are joined by a step of selected height, and a locking element formed with a first strip-shaped section configured to provide a guide area of a width corresponding to said height of said step and along which one of said adjacent guide surfaces of said hinge element is slidingly movable, a second strip-shaped section configured to provide a locking tab that is elastically deformable and a flat portion positioned between said first strip-shaped section and said second strip-shaped section having an opening for receiving a spring pin.

2. The spring-loaded hinge according to claim 1, wherein said first strip-shaped section is bent at a ninety-degree angle to said flat portion of said locking element and said second strip-shaped section is bent at an obtuse angle to said flat portion.

3. The spring-loaded hinge according to claim 2, wherein the guide area is a flat strip of material.

4. The spring-loaded hinge according to claim 1, wherein the locking element is formed from a single piece of material formed by a stamping/bending machine.

5. The spring-loaded hinge according to claim 1, wherein said guide area of said locking element is coated to facilitate sliding movement of said guide surface of said hinge element against said guide area.

6. The spring-loaded hinge according to claim 1, wherein said first and second strip-shaped sections are of different lengths.

7. The spring-loaded hinge according to claim 1, wherein the opening in said flat portion comprises a hole and wherein the locking element has an expanded zone in the area surrounding the hole.

8. The spring-loaded hinge according to claim 7, wherein the expanded zone has a ring shape.

9. The spring-loaded hinge according to claim 1, wherein the guide area of the locking element is configured for securing the locking element it against rotation.

10. A spring-loaded hinge for eyeglasses with a center part and bows, comprising a housing having a guide surface, at least one spring element, at least one hinge element having a hinge eye and a locking element, said locking element being formed from a flat piece of sheet metal and having a flat first strip-shaped section with a defined width, a flat portion formed at a right angle to said first strip-shaped section and a second strip-shaped section formed at an obtuse angle to said flat portion to provide a locking tab that is elastically deformable, said hinge element having adjacent guide surfaces joined by a step the height of which corresponds to said width of said first strip-shaped section whereby said guide surfaces provide uniform continuous contact of said hinge element with said locking element, housing and the eyeglasses, and wherein said hinge element also comprises an upper guide surface positioned opposite said adjacent guide surfaces and oriented to contact said guide surface of said housing to facilitate and stabilize sliding movement of said hinge element relative to said housing and locking element.

11. The spring-loaded hinge according to claim 10, wherein the flat portion of said locking element has an opening for receiving a spring pin.

12. The spring-loaded hinge according to claim 11, wherein the locking element has an expanded zone positioned about said opening in said flat portion.

13. The spring-loaded hinge according to claim 12, wherein the expanded zone has a ring shape.

14. The spring-loaded hinge according to claim 10, wherein the locking element has a guide area formed by and along said flat first strip-shaped section for slidingly guiding said at least one hinge element longitudinally.

15. The spring-loaded hinge according to claim 14 wherein said guide area of said locking element is coated to facilitate movement of said at least one hinge element therealong.

16. The spring-loaded hinge according to claim 10, wherein said first and second strip-shaped sections are of different lengths.

17. The spring-loaded hinge according to claim 10, wherein said flat first strip-shaped section is positioned against one of either said center part or bows to support and guide said at least one hinge element in sliding movement against said locking element.

18. The spring-loaded hinge according to claim 17, wherein said first strip-shaped section is configured to secure said locking element against rotation.

19. The spring-loaded hinge according to claim 17 wherein said first and second strip-shaped sections are of different lengths.

* * * * *

UNITED STATES PATENT AND TRADEMARK OFFICE
CERTIFICATE OF CORRECTION

PATENT NO.    : 6,892,422 B2
DATED         : May 17, 2005
INVENTOR(S)   : Klaus Schuchard

It is certified that error appears in the above-identified patent and that said Letters Patent is hereby corrected as shown below:

Title page,
Item [75], please correct the inventor's address as follows:
-- Ganzhornstrasse 3, 75305 Neuenbürg (DE); --

Column 8,
Line 5, delete "it".

Signed and Sealed this

Second Day of August, 2005

JON W. DUDAS
*Director of the United States Patent and Trademark Office*